United States Patent
Luo et al.

(10) Patent No.: US 10,152,827 B2
(45) Date of Patent: Dec. 11, 2018

(54) THREE-DIMENSIONAL MODELING METHOD AND ELECTRONIC APPARATUS THEREOF

(71) Applicant: HTC Corporation, Taoyuan (TW)

(72) Inventors: Sheng-Jie Luo, Taoyuan (TW); Liang-Kang Huang, Taoyuan (TW); Yu-Ting Wu, Taoyuan (TW); Tung-Peng Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 426 days.

(21) Appl. No.: 14/830,726

(22) Filed: Aug. 19, 2015

(65) Prior Publication Data

US 2016/0055682 A1     Feb. 25, 2016

Related U.S. Application Data

(60) Provisional application No. 62/040,423, filed on Aug. 22, 2014.

(51) Int. Cl.
    *G06T 19/20* (2011.01)
    *G06T 17/20* (2006.01)

(52) U.S. Cl.
    CPC ............ *G06T 19/20* (2013.01); *G06T 17/20* (2013.01); *G06T 2219/2021* (2013.01)

(58) Field of Classification Search
    None
    See application file for complete search history.

(56) References Cited

U.S. PATENT DOCUMENTS 6,072,496 A    6/2000 Guenter et al.

OTHER PUBLICATIONS

Cordier, Frederic, Hyewon Seo, and Nadia Magnenat-Thalmann. "Made-to-measure technologies for an online clothing store." IEEE Computer graphics and applications 23.1 (2003): 38-48.*
Roy, Michaël, et al. "Multiresolution analysis for meshes with appearance attributes." Image Processing, 2005. ICIP 2005. IEEE International Confer.*
Niswar, Arthur, Ishtiaq Rasool Khan, and Farzam Farbiz. "Virtual try-on of eyeglasses using 3D model of the head." Proceedings of the 10th International Conference on Virtual Reality Continuum and Its Applications in Industry. ACM, 2011.*
Koivunen V., Sepponen M. (1998) Texture Map Coding for Arbitrarily Shaped 2-D and 3-D Video Objects. In: Marshall S., Harvey N.R., Shah D. (eds) Noblesse Workshop on Non-Linear Model Based Image Analysis. Springer, London.*

* cited by examiner

*Primary Examiner* — Sarah Le
(74) *Attorney, Agent, or Firm* — CKC & Partners Co., Ltd.

(57) ABSTRACT

A method to provide a 3D outfit model able to be adjusted corresponding to a 3D human model. The method includes following steps. A three-dimensional (3D) human model is provided, and vertices of the 3D human model are located at first positions. A 3D outfit model is provided, and vertices of the 3D outfit model are located at second positions. In response to that the 3D human model is deformed and the vertices of the 3D human model are displaced from the first positions to third positions, the 3D outfit model is adjusted corresponding to the 3D human model, by setting each of the vertices of the 3D outfit model to fourth positions according to the second positions and displacements of the vertices of the 3D human model between the first positions and the third positions.

6 Claims, 13 Drawing Sheets

FIG. 11D ical application, such as virtual reality (VR) experience. In order to provide the stereoscopic visions, multimedia contents for 3D display must include three-dimensional information about objects to be displayed. Currently, common image files or video files include two-dimensional information only. It relies on 3D modeling technology to create a 3D model or convert a 2D source into a 3D (or 3D-alike) output.

THREE-DIMENSIONAL MODELING METHOD AND ELECTRONIC APPARATUS THEREOF

RELATED APPLICATIONS

This application claims the priority benefit of U.S. Provisional Application Ser. No. 62/040,423, filed Aug. 22, 2014, which is herein incorporated by reference.

BACKGROUND

Field of Invention

The present disclosure relates to a three-dimensional model and an electronic apparatus. More particularly, the present disclosure relates to how to obtain, create, modify, adjust, reconstruct and/or customize three-dimensional models or templates.

Description of Related Art

Three-dimensional (3D) display technology is a popular topic recently to provide users stereoscopic visions in some cutting-edge application, such as virtual reality (VR) experience. In order to provide the stereoscopic visions, multimedia contents for 3D display must include three-dimensional information about objects to be displayed. Currently, common image files or video files include two-dimensional information only. It relies on 3D modeling technology to create a 3D model or convert a 2D source into a 3D (or 3D-alike) output.

Usually, it takes a long time and a lot of computation source to construct a 3D model. The 3D modeling computation will occupy a processor (or an graphics computation card) for a long time. In addition, it is hard to create a smooth and flawless 3D model in detail (about textures, colors, shapes) within limited computation time.

SUMMARY

The disclosure provides a method to provide a 3D outfit model, which is able to be adjusted corresponding to a 3D human model. When the 3D human model is deformed, the 3D outfit model is adjusted according to the deformation of the 3D human model. The method includes following steps. A three-dimensional (3D) human model is provided, and vertices of the 3D human model are located at first positions. A 3D outfit model is provided, and vertices of the 3D outfit model are located at second positions. In response to that the 3D human model is deformed and the vertices of the 3D human model are displaced from the first positions to third positions, the 3D outfit model is adjusted corresponding to the 3D human model, by setting each of the vertices of the 3D outfit model to fourth positions according to the second positions and displacements of the vertices of the 3D human model between the first positions and the third positions.

The disclosure provides an electronic apparatus, which includes a storage module and at least one processor. The storage module is configured for storing a 3D human model and a 3D outfit model. Vertices of the 3D human model are located at first positions. Vertices of the 3D outfit model are located at second positions. The at least one processor is coupled with the storage module. In response to that the 3D human model is deformed and the vertices of the 3D human model are displaced from the first positions to third positions, the at least one processor is adapted to adjust the 3D outfit model corresponding to the 3D human model by setting each of the vertices of the 3D outfit model to fourth positions according to the second positions and displacements of the vertices of the 3D human model between the first positions and the third positions.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
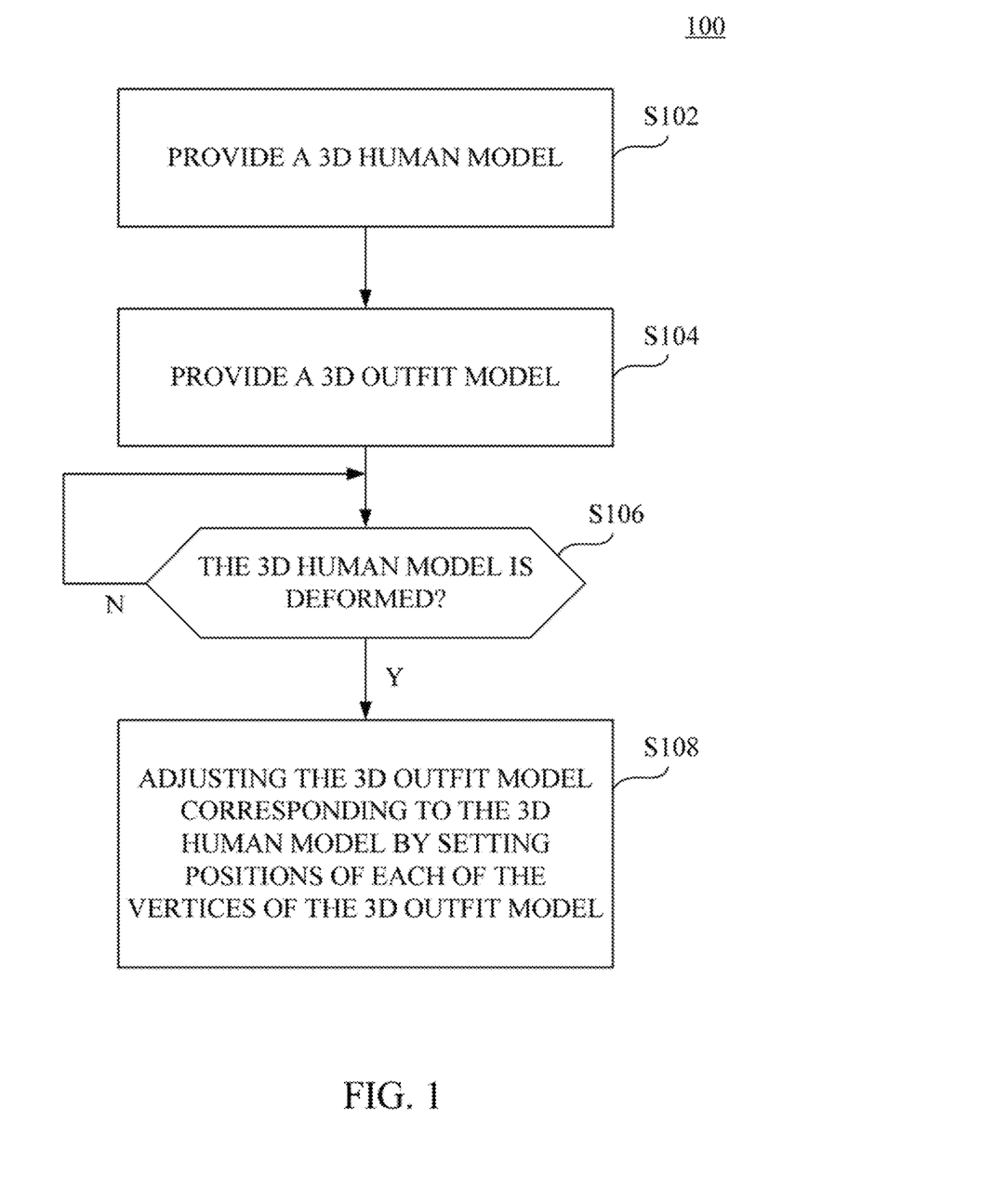
FIG. 1 is a flow chart illustrating a method for modifying a three-dimensional (3D) outfit model corresponding to a deformation of a 3D human model according to an embodiment of the disclosure.

Reference is made to FIG. 1, which is a flow chart illustrating a method 100 for modifying a three-dimensional (3D) outfit model corresponding to a deformation of a 3D human model according to an embodiment of the disclosure. In an embodiment shown in FIG. 1, a 3D human model is provided in step S102 of the method 100, and a 3D outfit model is provided in step S104. The step S102 and the step S104 are not limited to the order shown in FIG. 1. In another embodiment, the 3D outfit model is provided and then the 3D human model. In another embodiment, the 3D human model and the 3D outfit model are provided together at the same time.

Figure 2:
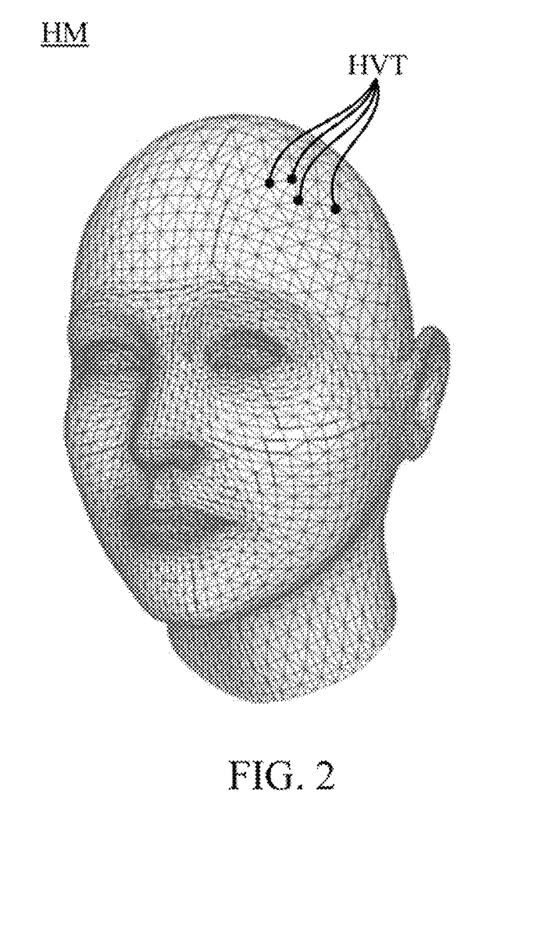
FIG. 2 is a schematic diagram illustrating a 3D human model according to an embodiment.
Figure 3:
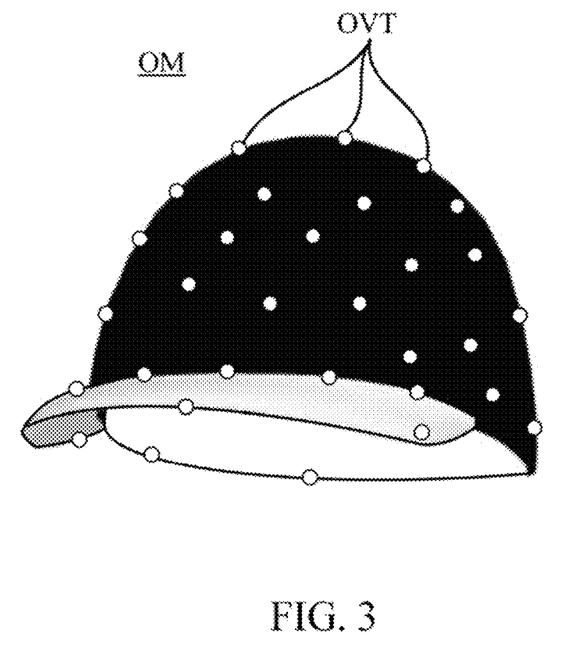
FIG. 3 is a schematic diagram illustrating a 3D outfit model according to an embodiment.

Reference is made to FIG. 2 and FIG. 3. FIG. 2 is a schematic diagram illustrating a 3D human model HM according to an embodiment. FIG. 3 is a schematic diagram illustrating a 3D outfit model OM according to an embodiment.

As shown in FIG. 2, the 3D human model HM comprises several vertices HVT. The vertices HVT of the 3D human model HM are utilized to describe a shape, a contour, a size and/or a scale of the 3D human model HM in the space. Each of the vertices HVT is located at different positions (e.g., has different coordinates in the Cartesian coordinate system) in the space. The vertices HVT are linked to each other to construct the shape of the 3D human model HM. In this embodiment, the vertices HVT of the 3D human model HM are respectively located at their own position, which are first positions (i.e., original positions of the vertices HVT) of the vertices HVT before the 3D human model HM is deformed.

In an embodiment, the 3D human model HM includes other information in addition to the vertices HVT. The 3D human model HM further includes color information, texture information and/or shadow information about an appearance of the 3D human model HM. Aforesaid information of the 3D human model HM is not shown in FIG. 2.

As shown in FIG. 3, the 3D outfit model OM comprises several vertices OVT. The vertices OVT of the 3D outfit model OM are utilized to describe a shape, a contour, a size and/or a scale of the 3D outfit model OM in the space. Each of the vertices OVT is located at different positions (e.g., has different coordinates in the Cartesian coordinate system) in the space. The vertices OVT of the 3D outfit model OM are not limited to the distribution shown in the embodiment of FIG. 3. In another embodiment, a density of the vertices OVT can higher for describing the 3D outfit model OM more precisely. In another embodiment, the density of the vertices OVT can lower for describing the 3D outfit model OM more concisely.

The vertices OVT are linked to each other to construct the shape of the 3D outfit model OM. In this embodiment, the vertices OVT of the 3D outfit model OM are respectively located at their own position, which are second positions (i.e., original positions of the vertices OVT).

In an embodiment, the 3D outfit model OM is an accessory outfit corresponding to the 3D human model HM. The 3D outfit model OM is designed to fit firmly on the 3D human model HM. In the embodiment illustrated in FIG. 2 and FIG. 3, the 3D human model HM is a human head model (or a human face model), and the 3D outfit model OM is a hat model, which can be worn or attached onto the 3D human model HM. However, the disclosure is not limited to this combination. When the 3D human model HM is a human head model (or a human face model), the 3D outfit model OM is a head kerchief model, an eyeglass model, a scarf model or a head accessory model in another embodiment.

In practical applications, the users may deform, adjust or customize the shape of the 3D human model HM by some deforming algorithm, such as the 3D human model HM can be adjusted to be slimmer than the original model, or the 3D human model HM can be adjusted to be thicker than the original model. If the 3D outfit model OM fails to be adjusted correspondingly, the 3D outfit model OM will no longer fit firmly on the 3D human model HM. The method 100 is able to adjust the 3D outfit model OM, such that the 3D outfit model OM after the adjustment can fit firmly on the 3D human model HM after the deformation.

As shown in FIG. 1, step S106 is execute to determine whether the 3D human model HM is deformed. If the 3D human model HM is not deformed, the method 100 returns to step S106. If the 3D human model HM is deformed, it means that the vertices of the 3D human model HM are displaced from the first positions (i.e., the original positions) to third positions (i.e., new position after the deformation), step S108 of the method 100 is executed to adjust the 3D outfit model OM corresponding to the 3D human model HM.

In an embodiment, the 3D outfit model OM is adjusted (in step S108) by setting each of the vertices OVT of the 3D outfit model to fourth positions (i.e., new positions of the vertices OVT after the deformation) according to the second positions (i.e., the original positions of the vertices OVT) and displacements of the vertices HVT of the 3D human model HM between the first positions (i.e., the original positions of the vertices HVT before the deformation) and the third positions (i.e., the new positions of the vertices HVT after the deformation).

In an embodiment, each one of the fourth positions corresponding to each one of the vertices OVT of the 3D outfit model OM is calculated respectively according its own second position and the displacements of the vertices HVT of the 3D human model HM. In other words, each of the vertices OVT of the 3D outfit model OM are calculated individually in this embodiment, such that the 3D outfit model OM will have a smooth shape and firmly fit on the 3D human model HM.

Figure 4A:
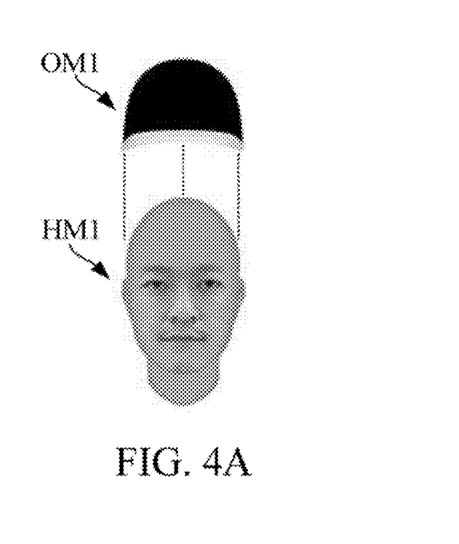
FIG. 4A and FIG. 4B are schematic diagrams illustrating a 3D human model and a 3D outfit model corresponding to the 3D human model before the 3D human model is deformed according to an embodiment.
Figure 4B:
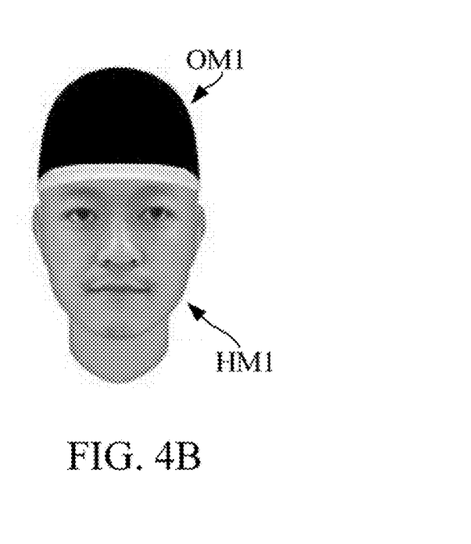

Reference is also made to FIG. 4A to FIG. 4B. FIG. 4A and FIG. 4B are schematic diagrams illustrating a 3D human model HM1 and a 3D outfit model OM1 corresponding to the 3D human model HM1 before the 3D human model HM1 is deformed according to an embodiment. The appearance (including information of shape, color and texture) of the 3D human model HM1 is illustrated in FIG. 4A and FIG. 4B. As shown in FIG. 4B, the 3D outfit model OM1 is a hat model which is attached onto the 3D human model HM1 and fits with the 3D human model HM1.

Figure 4C:
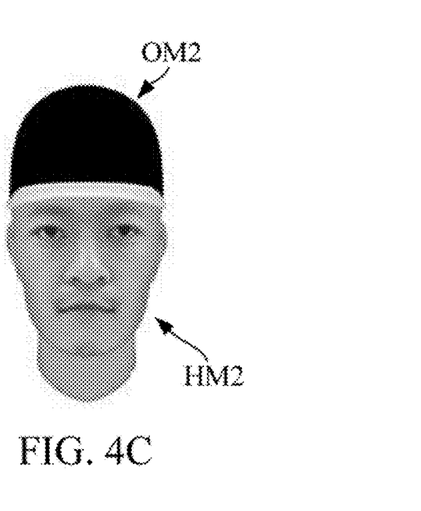
FIG. 4C is a schematic diagram illustrating a 3D human model and a 3D outfit model corresponding to the 3D human model after the deformation according to an embodiment.

Reference is also made to FIG. 4C. FIG. 4C is a schematic diagram illustrating a 3D human model HM2 and a 3D outfit model OM2 corresponding to the 3D human model HM2 after the deformation according to an embodiment. When the users adjust the 3D human model HM1 (shown in FIG. 4A and FIG. 4B) to be slimmer into the 3D human model HM2 shown in FIG. 4C. The fourth positions of the vertices of the 3D outfit model OM2 are calculated according to the second positions and the displacements between the vertices of the 3D human models HM1 and HM2, such that the 3D outfit model OM2 will be slimmer and fit on the 3D human model HM2 after the deformation.

Figure 4D:
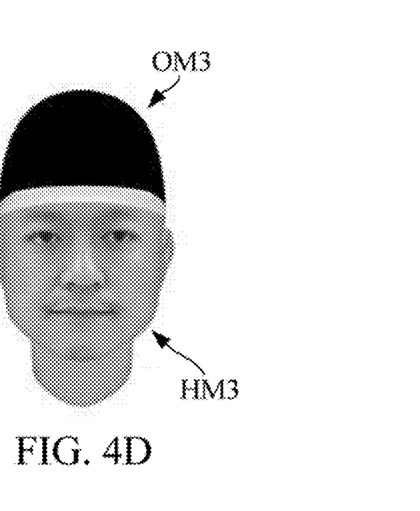
FIG. 4D is a schematic diagram illustrating a 3D human model and a 3D outfit model corresponding to the 3D human model after the deformation according to an embodiment.

Reference is also made to FIG. 4D. FIG. 4D is a schematic diagram illustrating a 3D human model HM3 and a 3D outfit model OM3 corresponding to the 3D human model HM3 after the deformation according to an embodiment. When the users adjust the 3D human model HM1 (shown in FIG. 4A and FIG. 4B) to be thicker into the 3D human model HM3 shown in FIG. 4D. The fourth positions of the vertices of the 3D outfit model OM3 are calculated according to the second positions and the displacements between the vertices of the 3D human models HM1 and HM3, such that the 3D outfit model OM3 will be thicker and fit on the 3D human model HM3 after the deformation.

Figure 5:
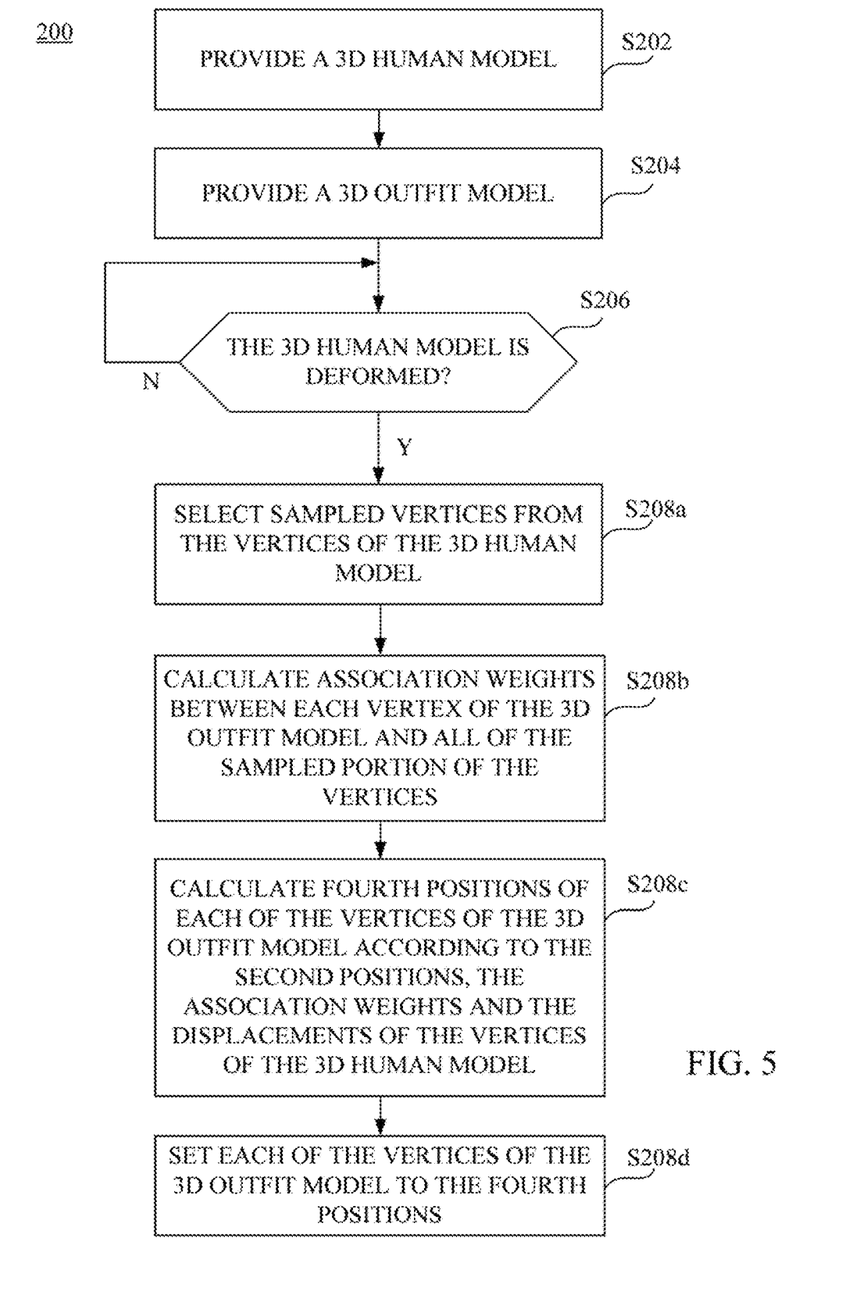
FIG. 5 is a flow chart illustrating a method for modifying a 3D outfit model corresponding to a deformation of a 3D human model according to another embodiment of the disclosure.

Reference is also made to FIG. 5, which is a flow chart illustrating a method 200 for modifying a 3D outfit model OM (referring to FIG. 3) corresponding to a deformation of a 3D human model HM (referring to FIG. 2) according to another embodiment of the disclosure. In the embodiment of FIG. 5, the method 200 discloses further details about how to adjust the 3D outfit model OM corresponding to the 3D human model HM (referring to step S108 shown in FIG. 1).

Steps S202 to S206 of the method 200 are similar to steps S102 to S106 of the method 100 in aforesaid embodiments shown in FIG. 1. In response to that the 3D human model HM is deformed, which means that the vertices of the 3D human model HM are displaced from the first positions (i.e., the original positions) to third positions (i.e., new position after the deformation), step S208a of the method 200 is executed to select a plurality of sampled vertices from the vertices HVT of the 3D human model HM (as shown in FIG. 2). Afterward, each fourth position of each vertex OVT of the 3D outfit model OM is individually calculated according to the second positions and the displacements of the sampled vertices of the 3D human model HM.

Figure 6A:
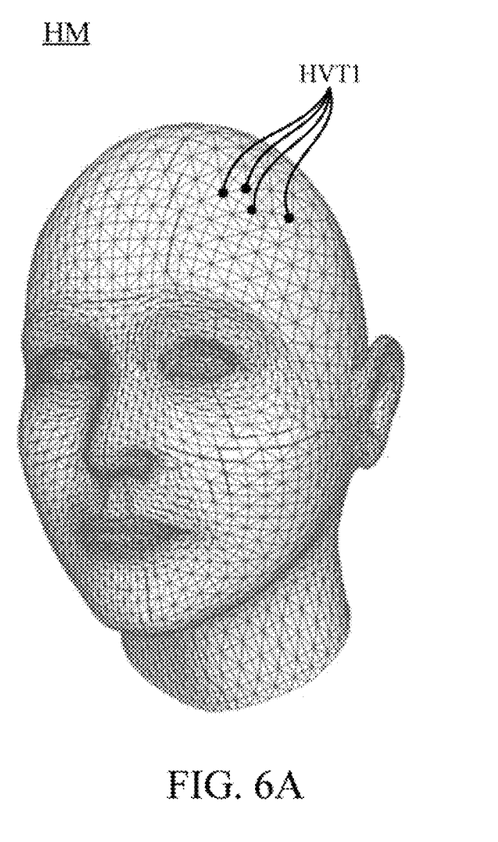
FIG. 6A is a schematic diagram illustrating sampled vertices of the 3D human model according to an embodiment.

Reference is also made to FIG. 6A. FIG. 6A is a schematic diagram illustrating sampled vertices HVT1 of the 3D human model HM according to an embodiment. In an embodiment shown in FIG. 6A, all of the vertices of the 3D human model HM are selected as the sampled vertices HVT1, such that the each fourth position of each vertex OVT of the 3D outfit model OM is individually calculated according to the sampled vertices HVT1 (i.e., all of the vertices) of the 3D human model HM. In the embodiment, the fourth positions of each vertex OVT of the 3D outfit model OM are affected by the displacements of the whole 3D human model HM in the deformation instead of one (or a few) critical point on the 3D human model HM, such that the adjusted 3D outfit model OM will be smooth and precisely fit on the 3D human model HM.

Figure 6B:
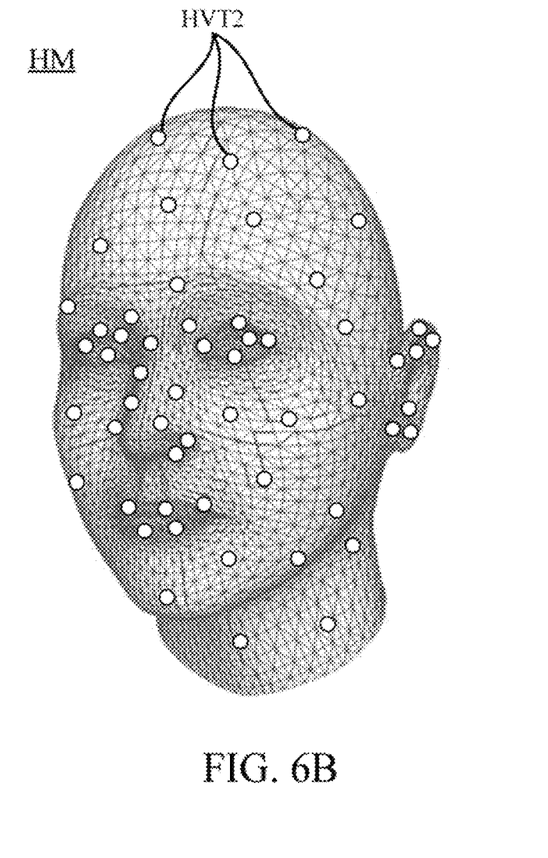
FIG. 6B is a schematic diagram illustrating sampled vertices of the 3D human model according to another embodiment.

Reference is also made to FIG. 6B. FIG. 6B is a schematic diagram illustrating sampled vertices HVT2 of the 3D human model HM according to another embodiment. In an embodiment shown in FIG. 6B, N vertices from every neighboring K vertices of the 3D human model HM are selected as the sampled vertices HVT2, and N, K are positive integers, 0<N<K. For illustration, one vertex from every 20 vertices in a neighboring area of the 3D human model as shown in FIG. 6B. In other embodiments, it can be 1 vertex selected from neighboring 10 vertices, 1 vertex selected from neighboring 35 vertices, or 3 vertices selected from neighboring 20 vertices, etc. Therefore, each fourth position of each vertex OVT of the 3D outfit model OM is individually calculated according to the sampled vertices HVT2, which are evenly/uniformly distributed over the whole 3D human model HM. In the embodiment, the calculations of the fourth positions of each vertex OVT of the 3D outfit model OM will be faster and easier.

Figure 6C:
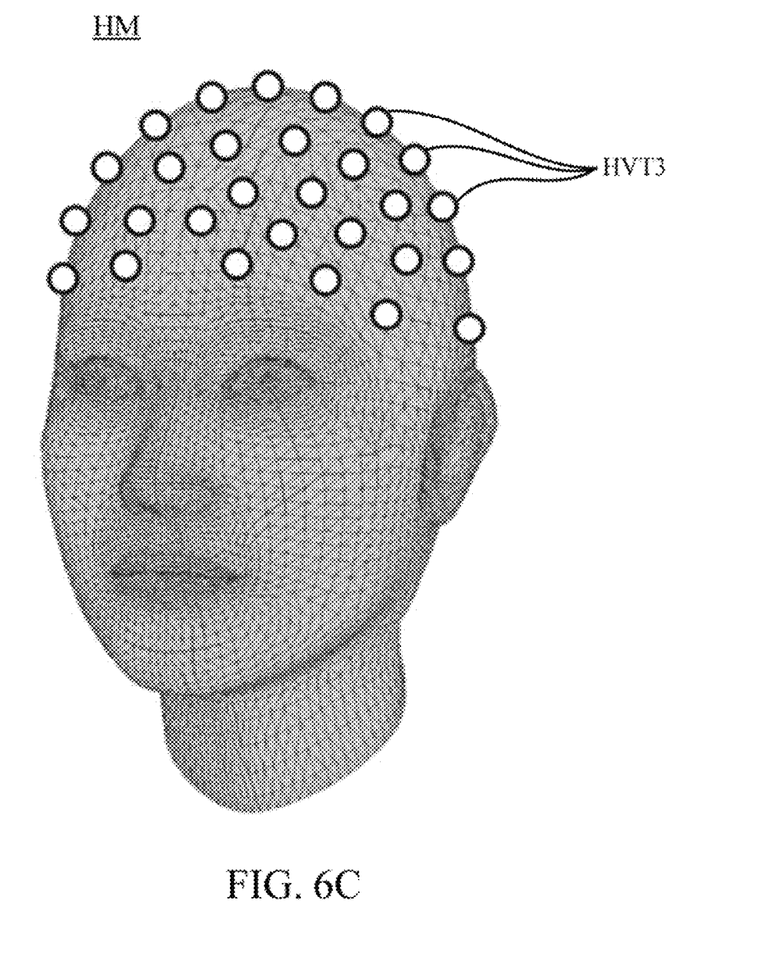
FIG. 6C is a schematic diagram illustrating sampled vertices of the 3D human model according to another embodiment.
Figure 7:
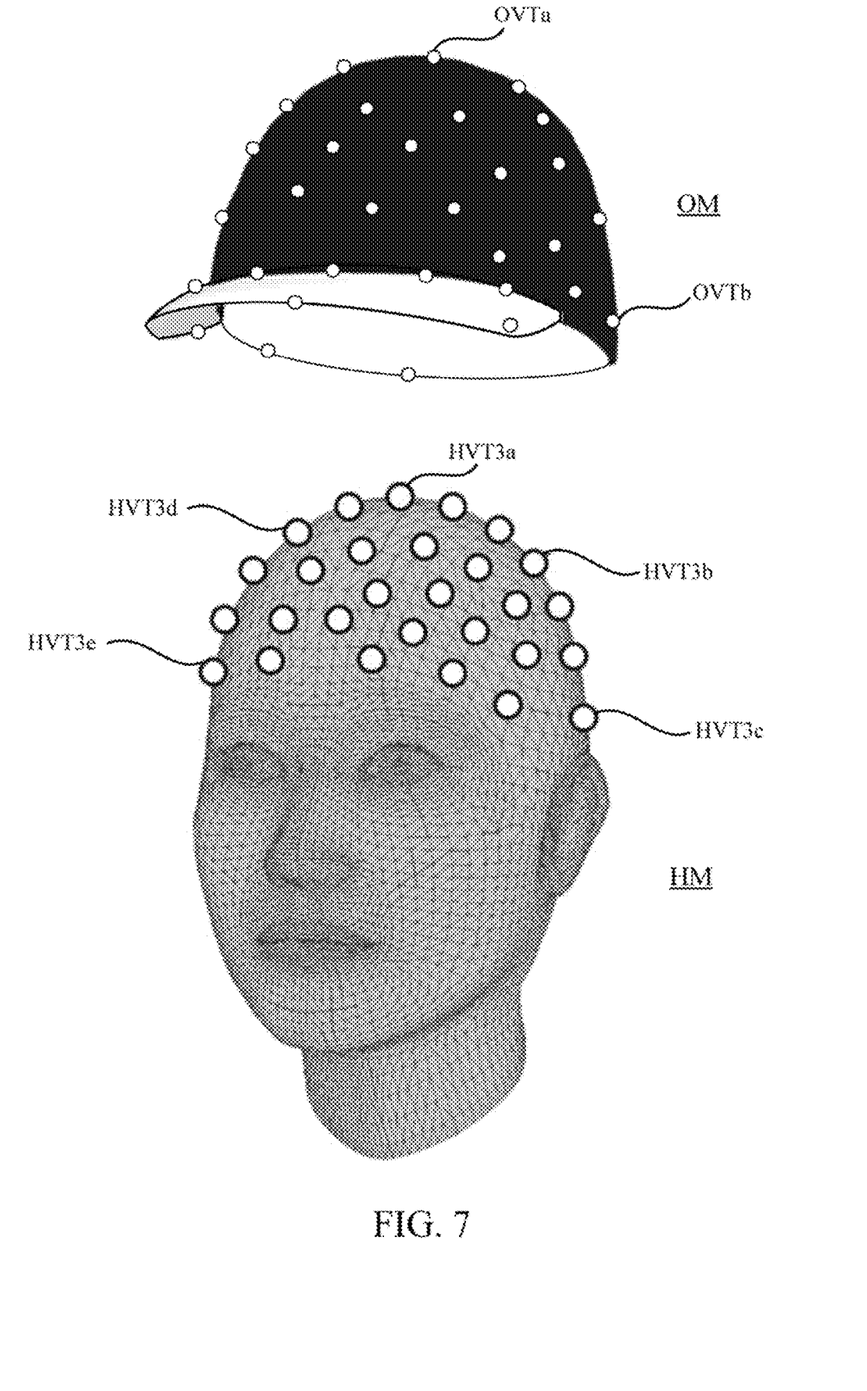
FIG. 7 is a schematic diagram illustrating the 3D human model and the 3D outfit model according to an embodiment.

Reference is also made to FIG. 6C. FIG. 6C is a schematic diagram illustrating sampled vertices HVT3 of the 3D human model HM according to an embodiment. In an embodiment shown in FIG. 6C, N vertices from every neighboring K vertices of the 3D human model HM are selected as the sampled vertices HVT3 and also the sampled vertices HVT3 are selected according to a geometry relationship between the 3D human model HM and the 3D outfit model OM, and N, K are positive integers, 0<N<K. For illustration, one vertex from every 15 vertices in a neighboring area of the 3D human model as shown in FIG. 6C, and the sampled vertices HVT3 are located on an upper portion of the 3D human model HM. In an embodiment shown in FIG. 6C, the sampled vertices are selected around a conjunction area between the 3D human model HM and the 3D outfit model OM. In an embodiment, the conjunction area is where the 3D human model HM meets or overlaps with the 3D outfit model OM. In another embodiment, the conjunction area is a gap existed in-between the 3D human model HM and the 3D outfit model OM. Reference is also made to FIG. 7, the 3D human model HM is a human face model or a human head model, and the 3D outfit model OM is a hat model. In other embodiments, the 3D outfit model OM is a head kerchief model, an eyeglass model, a scarf model or a head accessory model corresponding to the 3D human model HM.

As shown in FIG. 7, the sampled vertices (HVT3a~HVT3e) are located at a upper portion of the 3D human model HM. The upper portion (i.e., the top of the head) of the 3D human model HM is closer to the conjunction area (i.e., overlapping area or gapping space) between the human head model and the hat model, such that the sampled vertices HVT3 are selected in the distribution shown in FIG. 6C and FIG. 7. In the embodiment, the calculations of the fourth positions of each vertex OVT of the 3D outfit model OM will be faster and easier, and the adjusted 3D outfit model OM will be smooth and precisely fit on the upper portion of the 3D human model HM.

Each one of the fourth position of each vertex OVT of the 3D outfit model OM is individually calculated in related to all of the sampled vertices HVT1, HTV2 or HTV3 in aforesaid embodiments. In an embodiment, the position of one vertex OVT will not be affected by all of the sample vertices with equal weights. As shown in FIG. 7, the position of one vertex OVTa will be highly related to a sampled vertice HVT3a which is closer to the vertex OVTa, and less related to other vertices HVT3c/HVT3e which are far from the vertex OVTa.

Step S208b of the method 200 is executed to calculate association weights between each vertex of the 3D outfit model OM and all of the sampled vertices HVT. An association weight measures how much the translation of a sampled vertex affects the translation of the each vertex OVT of the 3D outfit model OM. Basically, a closer sampled vertex affect more on a specific vertex OVT of the 3D outfit model OM. The vertex OVTa is highly affected by the sampled vertex HVT3a, and less affected by the sampled vertices HVT3c/HVT3e. On the other hand, the vertex OVTb is highly affected by the sampled vertex HVT3c, and less affected by the sampled vertices HVT3e.

Therefore, the association weight can be computed as follows:

$$W(v_i, v_j) = -\exp(-\|v_i - v_j\|^2/c),$$

where $v_i$ is the second position (the original position) of a vertex on the 3D outfit model OM, and $v_j$ is the first position (the original position) of a sampled vertex on the 3D human model HM.

The association weights are negatively correlated to distances between each vertex of the 3D outfit model OM and the sampled vertices of the 3D human model HM. Aforesaid association weights can be computed by any equation which decays with larger distances in other embodiments.

Step S208c is executed to calculate the fourth positions of each of the vertices of the 3D outfit model according to the second positions, the association weights and the displacements of the vertices of the 3D human model between the first positions and the third positions. When the 3D human model HM is deformed/customized/adjusted (referring to FIG. 4A to FIG. 4D), the first position $v_j$ (the original position) of each sampled vertex on the 3D outfit model OM moves to the third position $v'_j$ (the new position). In response to the deformation, the second position $v_i$ (the original position) of each vertex on the 3D outfit model OM should be moved correspondingly to the fourth position $v'_i$ (the new position), which is computed as:

$$v'_i = v_i + \sum_j W(v_i, v_j)(v'_j - v_j) / \sum_j W(v_i, v_j)$$

The fourth position, $v'_i$, is computed according to the second positions, $v_i$, the association weights and the displacements, $(v'_j - v_j)$, of the vertices of the 3D human model between the first positions and the third positions.

In Step S208c, each vertex on the 3D outfit model OM is adjusted individually and smoothly according to the sampled vertices, and the fourth position of each vertex is relatively highly affected by near sampled vertices and relatively less affected by far sampled vertices.

Step S208d is executed to set each of the vertices of the 3D outfit model OM to the fourth positions calculated in step S208c, such that the 3D outfit model OM is adjusted corresponding to the 3D human model HM by setting each of the vertices of the 3D outfit model OM to the fourth positions.

In aforesaid embodiments, the 3D human model HM and the 3D outfit model OM are illustrated to be a human head model and a hat model for demonstrations. However, the disclosure is not limited thereto. When the 3D human model comprises a human face model or a human head model, the 3D outfit model comprises a hat, a head kerchief model, an eyeglass model, a scarf model or a head accessory model. In another embodiment, when the 3D human model comprises a human body model, the 3D outfit model comprises a clothing model, a footwear model or a body accessory model.

Figure 8A:
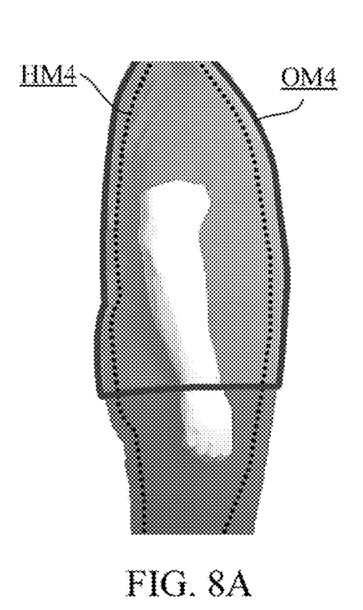
FIG. 8A is a schematic diagram illustrating a 3D human model and a 3D outfit model before a deformation according to another embodiment.
Figure 8B:
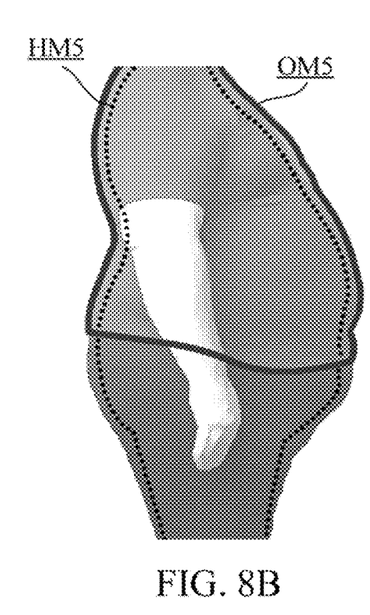
FIG. 8B is a schematic diagram illustrating a 3D human model and a 3D outfit model after the deformation relative to the embodiment shown in FIG. 8A.

Reference is also made to FIG. 8A and FIG. 8B. FIG. 8A is a schematic diagram illustrating a 3D human model HM4 and a 3D outfit model OM4 before a deformation according to another embodiment. In the embodiment illustrated in FIG. 8A, the 3D human model HM4 is a human body model, and the 3D outfit model OM4 is a clothing model. The clothing model can be a shirt, a t-shirt, a dress, a pant, a short pant, a sock, a cloak, or other outfit clothing. The 3D outfit model OM4 shown in FIG. 8A is a t-shirt for demonstration. FIG. 8B is a schematic diagram illustrating a 3D human model HM5 and a 3D outfit model OM5 after the deformation relative to the embodiment shown in FIG. 8A. In response to that the 3D human model HM4 in FIG. 8A is deformed to the 3D human model HM5 in FIG. 8B, the 3D outfit model OM4 is adjusted into the 3D outfit model OM5 corresponding to the deformation of the 3D human model from HM4 to HM5 by aforesaid method 100 or 200. The details of the method 100 or 200 are disclosed and not repeated here.

Figure 9:
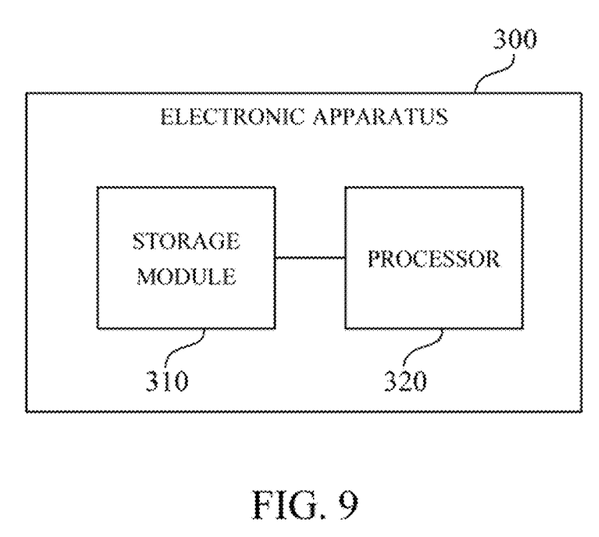
FIG. 9 is a schematic diagram illustrating an electronic apparatus according to an embodiment of the disclosure.

Another embodiment of the disclosure is an electronic apparatus, which is suitable to execute aforesaid method 100 and/or aforesaid method 200. Reference is made to FIG. 9, which is a schematic diagram illustrating an electronic apparatus 300 according to an embodiment of the disclosure. The electronic apparatus 300 comprises a storage module 310 and at least one processor 320. The storage module 310 is configured for storing a 3D human model (referring HM in FIG. 2, FIG. 6A to FIG. 6C or FIG. 7) and a 3D outfit model (referring OM in FIG. 3, FIG. 6A to FIG. 6C or FIG. 7). Vertices of the 3D human model are located at first positions. Vertices of the 3D outfit model are located at second positions. The storage module 310 can be a transitory computer-readable storage (such as a memory, registers, a RAM, etc) or a non-transitory computer-readable storage (such as a flash memory, a ROM, a hard drive, etc).

The at least one processor 320 is coupled with the storage module 310. In response to that the 3D human model is deformed and the vertices of the 3D human model are displaced from the first positions to third positions, the at least one processor 320 is adapted to adjust the 3D outfit model corresponding to the 3D human model by setting each of the vertices of the 3D outfit model to fourth positions according to the second positions and displacements of the vertices of the 3D human model between the first positions and the third positions. The at least one processor 320 can be a central processing unit (CPU), an image processor, a system-on-chip (SoC) unit, or any equivalent processing unit.

Another embodiment of the disclosure is related a method of customizing facial model.

In this method, the system has a pre-loaded general facial 3D model and several predefined 3D facial landmarks on the model. The system takes one user frontal selfie image as input and detects 2D locations of predefined facial landmarks. Finally, the system deforms the general 3D facial model by two constraints. The first constraint is a facial landmarks constraint which asks the location of projected 3D facial landmarks to be the same as the locations of detected 2D facial landmarks on the input frontal image. The second constraint is a shape constraint which asks all 3D vertices to keep the original relationship with their neighbors. After the deformation, a customized facial model is constructed.

Figure 10A:
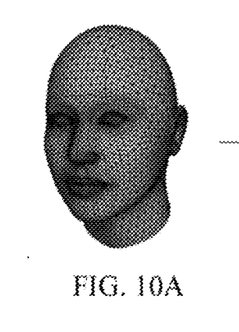
FIG. 10A to FIG. 10F are schematic diagrams illustrating a method of customizing facial model according to another embodiment of the disclosure.
Figure 10B:
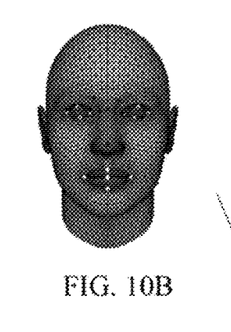

The system has a pre-loaded general 3D facial model as shown in FIG. 10A and several predefined 3D facial landmarks on the model as shown in FIG. 10B.

Figure 10C:
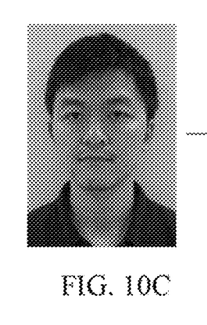
Figure 10D:
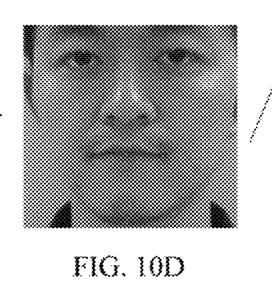
Figure 10E:
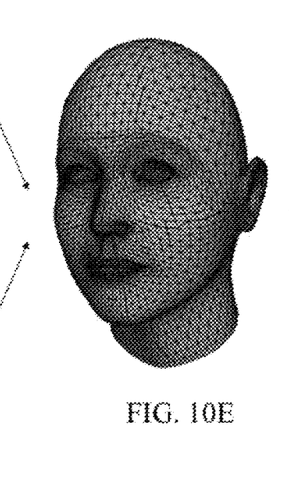
Figure 10F:
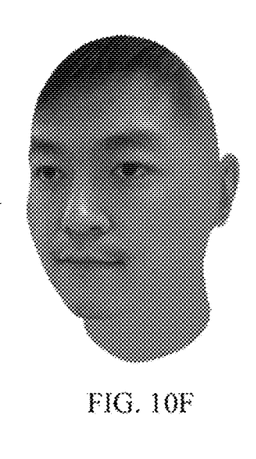

The system takes a frontal facial selfie image as input as shown in FIG. 10C and then detects the locations of 2D facial landmarks on the image as shown in FIG. 10D.

The system formulates the deformation the general 3D facial model as an energy minimization problem with the following two constraints.

The first constraint is the facial landmarks constraint, which is utilized to make the deformed 3D facial model being similar with the user's face. The system projects the template 3D facial model on to a 2D image plane and asks locations of projected 3D facial landmarks to be the same as locations of detected 2D facial landmarks. By this way, the system ensures the deformed facial model to be similar with the user's face. Specifically, the system is implemented by choosing a "pivot" facial landmark and the deformation is constrained by keeping all relationships between each facial landmark and the pivot facial landmark, which is formulated by the following error function.

$$E_f = \frac{1}{|V^f|} \sum_{v_i \in V^f} \|PR(v_i' - v_{pivot}) - S(p_i - p_{pivot})\|^2$$

where P and R are projection and rotation matrices respectively, S is a scaling factor, and $V_{pivot}$ and $P_{pivot}$ are the pivot facial landmark in 3D and 2D respectively.

The first constraint is the shape constraint. With only the previous facial landmarks constraint, the deformation could results to a model which is no longer to be recognizable as a face. In order to ensure the deformed model to keep the face shape, the system asks each 3D vertex to keep the relationship between all its neighbor vertices. The relationship of each vertex and all its neighbors is defined by the offset of each vertex and the central of all its neighbors which could be formulated as follows.

$$\mathcal{L}(v_i) = v_i - \frac{1}{|\mathcal{N}(v_i)|} \sum_{v_j \in \mathcal{N}(v_i)} v_j$$

And then, the deformation is asked to keep these relationships to be as the same as possible before and after the deformation.

$$E_g = \frac{1}{|V|} \sum_{v_i \in V} \left\| \left( v_i' - \frac{1}{|\mathcal{N}(v_i)|} \sum_{v_j \in \mathcal{N}(v_i)} v_i' \right) - \mathcal{L}(v_i) \right\|^2,$$

where $V_i'$ is the location of $V_i$ after model deformation.

The above mentioned two error functions are combined with a weighting ($w_f$) to be the final total error function as the following formula. By minimizing the total error function, a customized facial model is reconstructed.

$$E_{total} = w_f E_f + E_g$$

Another embodiment of the disclosure is related to a system for obtaining the input required by a 3D face reconstruction.

The system starts by guiding the user to take face photos with the face posed in several angles. Then require the user to determine certain parameters required by the face reconstruction process, such as detected facial landmark positions and template head/face 3D models. The invention comprises the user interfaces that are designed to collect these input data effectively.

The flows of the proposed system includes three stages, which are face photo capturing, facial landmark adjustment and template model selection.

Figure 11A:
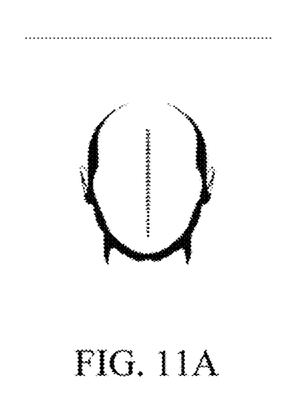
FIG. 11A to FIG. 11D are schematic diagrams illustrating a system for obtaining the input required by a 3D face reconstruction according to another embodiment of the disclosure.
Figure 11B:
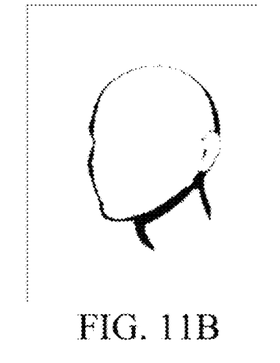

In the stage of the face photo capturing, the target of this stage is to obtain images of the face posed in several angles. The proposed system has different designs for capturing a frontal face and face in other angles. For capturing the frontal face, the system guides the user by showing a face contour image on the screen (as illustrated in FIG. 11A). The outside contour help user to capture the face in an appropriate scale and position. Inside the contour, a vertical line is drawn at the central. This has the effect of providing user the intention to keep his/her face symmetric inside the contour, or more specifically, to keep his/her face parallel to the surface of the screen, which is a requirement of the later face reconstruction process. For other angles, two scenarios are considered. The first scenario is that the user rotates his/her face while the camera stays still. The second scenario is that the user rotates the camera around his/her face while the face stays still. For the formal scenario, face contour images of the desired angles are shown on the screen (as illustrated in FIG. 11B). The effect of these guidance images is similar to the one for capturing the frontal face. If the user performs the second scenario, besides the face contour images, the motion sensor (gyro) information can be referenced and capture the image automatically when the camera is rotated to the desired angle. Also at this stage, some notifications for specifying the condition of capturing (such as glasses off, put away your hair and lighting should be normal) could be showed on the screen.

Figure 11C:
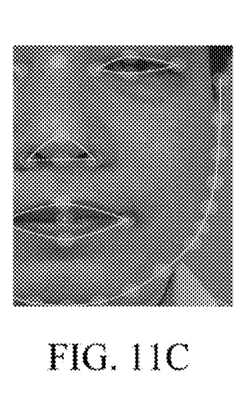

In the stage of the facial landmark adjustment, in order to perform 3D face reconstruction, the positions of certain facial landmarks points on the 2D images should be detected. As these are one of the most critical information required by the face reconstruction process, it is necessary to confirm the detection result with the user, and provide a mechanism for the user to adjust the positions of the detected points. There are designs such as directly marking the points on the image, and specifying what facial part the point indicates by showing text or exemplar images. However, this design is not suitable when the amount of landmark points grow large as showing text or exemplar images require space on the screen. Also when the amount grows large, it is hard to distinguish the indicated facial part of the points by words. There are other designs that provide a rough shape of the organs instead of some isolated points. However, this design is not suitable when we require accurate positions of some critical points. It is suitable for systems that only require a rough estimation of the shape and position of the organs. The proposed design is similar to the first design by marking the detected points on the screen. However the difference is the points that belong to a particular organ would be connected by smooth curves. As illustrated in FIG. 11C, the user would have a clue of what facial part does a particular point stands for, without seeing explicit hint such as text and exemplar images.

Figure 11D:
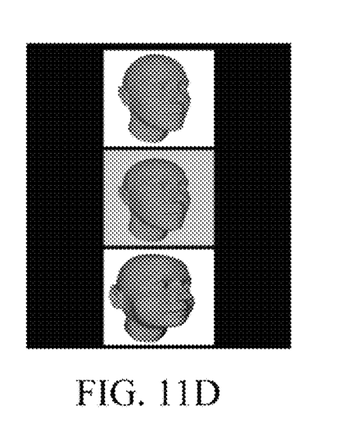

In the stage of the template model selection, though the 3D reconstruction process will determine the shape of reconstructed model mostly based on the information provided in the 2D images, selecting a template face model that resembles the user's face or a template face model that have characteristics similar to the user's face could further improve the reconstruction result. Thus in this stage, the system provide the option for user to specify a template head/face model that looks suitable for reconstruction. The template models are prepared and built in the system, as illustrated in FIG. 11D. The template models aim to cover all major types of faces (such as fat face, tall forehead, etc).

By going through the above stages, the system for obtaining the input required by a 3D face reconstruction will obtain quality input data required by the later face reconstruction process.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method, comprising:
providing a three-dimensional (3D) human model, a plurality of vertices of the 3D human model being located at first positions;
providing a 3D outfit model, a plurality of vertices of the 3D outfit model being located at second positions;
in response to that the 3D human model is deformed and the vertices of the 3D human model are displaced from the first positions to third positions, adjusting the 3D outfit model corresponding to the 3D human model by setting each of the vertices of the 3D outfit model to fourth positions according to the second positions and displacements of the vertices of the 3D human model between the first positions and the third positions,
wherein the step of adjusting the 3D outfit model comprises:
selecting a plurality of sampled vertices from the vertices of the 3D human model according to a geometry relationship between the 3D human model and the 3D outfit model, the sampled vertices are located on a conjunction area between the 3D human model and the 3D outfit model;
calculating association weights respectively for each of the vertices of the 3D outfit model by separately calculating the association weights between one of the vertices of the 3D outfit model and all of the sampled vertices on the conjunction area, wherein the association weights are negatively correlated to distances between the one of the vertices of the 3D outfit model and the sampled vertices; and
calculating the fourth positions of each of the vertices of the 3D outfit model according to the second positions, the association weights and the displacements of the sampled vertices of the 3D human model between the first positions and the third positions, each one of the fourth position of the vertices of the 3D outfit model is individually calculated in related to all of the sampled vertices on the conjunction area between the 3D human model and the 3D outfit model.

2. The method of claim 1, wherein the 3D human model comprises a human face model or a human head model, and the 3D outfit model comprises a hat model, a head kerchief model, an eyeglass model, a scarf model or a head accessory model.

3. The method of claim 1, wherein the 3D human model comprises a human body model, and the 3D outfit model comprises a clothing model, a footwear model or a body accessory model.

4. An electronic apparatus, comprising:
a storage module, configured for storing a 3D human model and a 3D outfit model, a plurality of vertices of the 3D human model being located at first positions, and a plurality of vertices of the 3D outfit model being located at second positions; and
at least one processor coupled with the storage module, the at least one processor being adapted to:
in response to that the 3D human model is deformed and the vertices of the 3D human model are displaced from the first positions to third positions, adjust the 3D outfit model corresponding to the 3D human model by setting each of the vertices of the 3D outfit model to fourth positions according to the second positions and displacements of the vertices of the 3D human model between the first positions and the third positions, wherein the at least one processor adjusts the 3D outfit model by:
selecting a plurity of sampled vertices from the vertices of the 3D human model and the according to a geometry relationship between the 3D human model and the 3D outfit model, the sampled vertices are located on a conjunction area between the 3D human model and the 3D outfit model;
calculating association weights respectively for each of the vertices of the 3D outfit model by separately calculating the association weights between one of the vertices of the 3D outfit model and all of the sampled vertices on the conjunction area, wherein the association weights are negatively correlated to distances between the one of the vertices of the 3D outfit model and the sampled vertices; and
calculating the fourth positions of each of the vertices of the 3D outfit model according to the second positions, the association weights and the displacements of the vertices of the 3D human model between the first positions and the third positions, each one of the fourth position of the vertices of the 3D outfit model is individually calculated in related to all of the sampled vertices on the conjunction area between the 3D human model and the 3D outfit model.

5. The electronic apparatus of claim 4, wherein the 3D human model comprises a human face model or a human head model, and the 3D outfit model comprises a hat model, a head kerchief model, an eyeglass model, a scarf model or a head accessory model.

6. The electronic apparatus of claim 4, wherein the 3D human model comprises a human body model, and the 3D outfit model comprises a clothing model, a footwear model or a body accessory model.

* * * * *